US010525918B2

(12) United States Patent
Naderer et al.

(10) Patent No.: US 10,525,918 B2
(45) Date of Patent: Jan. 7, 2020

(54) DEFORMATION STRUCTURE AND PEDESTRIAN PROTECTION DEVICE HAVING A DEFORMATION STRUCTURE

(71) Applicant: Bayerische Motoren Werke Aktiengesellschaft, Munich (DE)

(72) Inventors: Simon Konrad Naderer, Burgberg (DE); Gerhard Fichtinger, Grasbrunn (DE); Wilhelm Riedl, Pfaffenhofen (DE); Oeztzan Akif, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/131,581

(22) Filed: Sep. 14, 2018

(65) Prior Publication Data
US 2019/0016295 A1 Jan. 17, 2019

Related U.S. Application Data

(63) Continuation of application No. PCT/EP2017/055904, filed on Mar. 14, 2017.

(30) Foreign Application Priority Data

Mar. 15, 2016 (DE) .................. 10 2016 204 264

(51) Int. Cl.
*B60R 19/34* (2006.01)
*B60R 19/18* (2006.01)
(Continued)

(52) U.S. Cl.
CPC .............. *B60R 19/18* (2013.01); *B60R 21/34* (2013.01); *B60R 2019/007* (2013.01); *B60R 2019/186* (2013.01)

(58) Field of Classification Search
CPC ... B60R 19/18; B60R 21/34; B60R 2019/007; B60R 2019/186
(Continued)

(56) References Cited

U.S. PATENT DOCUMENTS 3,888,531 A * 6/1975 Straza .................. B60R 19/18
293/120
4,890,877 A 1/1990 Ashtiani-Zarandi et al.
(Continued)

FOREIGN PATENT DOCUMENTS

DE 10 2004 047 884 A1 4/2006
DE 20 2009 016 759 U1 5/2010
(Continued)

OTHER PUBLICATIONS

International Search Report (PCT/ISA/210) issued in PCT Application No. PCT/EP2017/055904 dated May 24, 2017 with English translation (eight pages).
(Continued)

*Primary Examiner* — Dennis H Pedder
(74) *Attorney, Agent, or Firm* — Crowell & Moring LLP (57) ABSTRACT

A deformation structure has at least a first layer and a second layer, which are spaced apart from each other and displaceable relative to each other in the deformation direction or load direction. The first layer and the second layer have complementary protrusions and recesses, which are designed in such a way that the protrusions of the first layer can plunge into the recesses of the second layer and the protrusions of the second layer can plunge into the recesses of the first layer. The first layer and the second layer are connected to each other by deformable webs in such a way that, in the event of a high impulse in the deformation direction, the protrusions of the first layer plunge into the recesses of the second layer and the protrusions of the
(Continued)

second layer plunge into the recesses of the first layer such that deformation of the deformation structure in the deformation direction occurs at a relatively low force level and, in the event of a low impulse in the deformation direction, the protrusions of the first layer hit the protrusions of the second layer such that further deformation of the deformation structure in the deformation direction occurs at a relatively high force level.

14 Claims, 5 Drawing Sheets

(51) Int. Cl.
*B60R 21/34* (2011.01)
*B60R 19/00* (2006.01)

(58) Field of Classification Search
USPC .... 52/783.11, 783.14–783.16; 293/102, 120, 293/121, 132, 133, 135, 136; 296/187.03, 296/187.08–187.12
See application file for complete search history.

(56) References Cited

U.S. PATENT DOCUMENTS

| | | | | |
|---|---|---|---|---|
| 5,435,619 A | * | 7/1995 | Nakae | B60J 5/0441 296/146.6 |
| 6,003,283 A | * | 12/1999 | Hull | E04C 2/365 52/783.15 |
| 6,458,447 B1 | * | 10/2002 | Cabell | B29C 55/18 162/109 |
| 9,493,190 B1 | * | 11/2016 | Alwan | B62D 21/157 |
| 2007/0200376 A1 | | 8/2007 | Jaarda et al. | |
| 2009/0282778 A1 | * | 11/2009 | Bertero | E04C 2/16 52/783.14 |
| 2011/0309653 A1 | | 12/2011 | Schuler et al. | |
| 2017/0282823 A1 | | 10/2017 | Akif et al. | |

FOREIGN PATENT DOCUMENTS

| | | |
|---|---|---|
| DE | 10 2010 054 641 A1 | 6/2012 |
| DE | 10 2012 112 636 A1 | 7/2014 |
| FR | 2 729 621 B1 | 3/1997 |
| WO | WO 2009/116395 A1 | 9/2009 |
| WO | WO 2016/096528 A1 | 6/2016 |

OTHER PUBLICATIONS

German-language Written Opinion (PCT/ISA/237) issued in PCT Application No. PCT/EP2017/055904 dated May 24, 2017 (five pages).

German-language Search Report issued in counterpart German Application No. 10 2016 204 264.5 dated Jan. 30, 2017 with partial English translation (13 pages).

* cited by examiner

DEFORMATION STRUCTURE AND PEDESTRIAN PROTECTION DEVICE HAVING A DEFORMATION STRUCTURE

CROSS REFERENCE TO RELATED APPLICATIONS

This application is a continuation of PCT International Application No. PCT/EP2017/055904, filed Mar. 14, 2017, which claims priority under 35 U.S.C. § 119 from German Patent Application No. 10 2016 204 264.5, filed Mar. 15, 2016, the entire disclosures of which are herein expressly incorporated by reference.

BACKGROUND AND SUMMARY OF THE INVENTION

The present invention relates to a deformation structure and to a pedestrian protection device having a deformation structure which is arranged between a body outer skin element and a body carrier element.

A known front end of a motor vehicle has, for example, a bumper cross member which is fastened to front ends of longitudinal members, and a bumper cladding, wherein a soft foam which is deformable at a comparatively low load level is arranged between the bumper cladding and the bumper cross member in order to protect pedestrians. On account of pedestrian protection, the soft foam is arranged in order to protect a pedestrian where appropriate against direct and immediate collision with a hard, stiff structure of the motor vehicle, such as, for example, the bumper cross member.

Furthermore, it is required for the motor vehicle to remain free from damage in a collision in a very low speed range of up to, for example, 4 km/h, in which the pedestrian protection is irrelevant because of the low speed.

Furthermore, at a somewhat higher speed, which is likewise still not relevant for pedestrian protection, it is required that damage during a collision is as small as possible and, for example, a radiator structure which is located in the front end region is not damaged. For this purpose, it would be helpful if the structure which is located in front of the bumper cross member already has adequate capability of absorbing collision energy.

The different requirements are partially in conflict with one another and require a comparatively long vehicle overhang at the vehicle front and therefore a higher weight, and are a disadvantageous influence on the driving dynamics.

In order to solve the resulting conflict of objectives, a bumper arrangement with a cross member which is fastened to the vehicle body via crash boxes has been proposed, for example, in DE 102010054641 A1. A pedestrian protection element for a soft impact against a pedestrian is formed in front of the cross member in the direction of travel. In addition, a pivotable energy absorption element is provided which is pivotable in front of the pedestrian protection element and thereby permits increased energy absorption in collisions in which a higher collision energy absorption capability of the crash structure of the motor vehicle is required.

DE 102012112636 A1 likewise shows a bumper arrangement, comprising a bumper cross member and a pedestrian protection element which can be switched over by means of an actuator from a stiff state into a comparatively soft state which serves for pedestrian protection.

A common feature of the bumper arrangements described in DE 102010054641 A1 and DE 102012112636 A1 is that a crash or pre-crash sensor system is required for this purpose wherein, on the basis of the output signals of the sensor system, a switch can be made between a hard, stiff state of the crash structure with high collision energy absorption capability and a soft state of the crash structure with low collision energy absorption capability in favor of pedestrian protection.

It is therefore the object of the present invention to provide a deformation structure and a pedestrian protection device having the deformation structure for a motor vehicle, said deformation structure being deformable at different energy levels depending on a load situation, and being of simple construction and functioning independently of a sensor system or an actuator.

This and other object are achieved by a deformation structure according to the invention, which may also be called an energy absorption structure, having at least one first layer and a second layer, which are arranged spaced apart from each other in the deformation direction or load direction and so as to be displaceable with respect to each other. The first layer and the second layer have complementary protrusions and depressions, which are designed in such a manner that the protrusions of the first layer and the depressions of the second layer and also the protrusions of the second layer and depressions of the first layer are insertable into one another. The first layer and the second layer are connected to each other via deformable web elements in such a manner that, in the event of a high impulse in the deformation direction, the protrusions of the first layer enter into the depressions of the second layer and also the protrusions of the second layer enter into the depressions of the first layer, and therefore deformation of the deformation structure in the deformation direction takes place at a relatively low force level, and, in the event of a low impulse in the deformation direction, the protrusions of the first layer strike against the protrusions of the second layer, and therefore further deformation of the deformation structure in the deformation direction takes place at a relatively high force level.

By this means, it is possible to provide a deformation structure which is deformable at different energy levels depending on a load situation, i.e. a collision impulse, and therefore has different stiffnesses. The "switching over" between the two stiffnesses takes place automatically here independently of a sensor system or an actuator. The setting of the stiffnesses is brought about here by a certain geometrically complementary configuration of the first layer and of the second layer and the connection of the layers via the connecting elements.

According to a development, the first layer and the second layer are furthermore shiftable in a direction parallel to each other by deformation of the web elements.

In particular, the web elements in the case of the deformation structure can be designed in such a manner that they fail in a brittle and/or plastic manner in the event of the high collision impulse, and wherein the web elements act in a manner corresponding to a film hinge in the event of the low collision impulse.

The web elements designed as film hinges can bring about a pivoting movement here of the first layer and of the second layer with respect to each other, in which the first layer and the second layer are shifted parallel to each other and also in the deformation direction, i.e. toward each other.

By this means, a defined pivoting movement of the first layer and of the second layer toward each other is possible, and the stiffness-increasing position of the first layer and of the second layer with respect to each other can be reliably taken up.

In the event of the high collision impulse, the failure of the web elements prevents the pivoting movement of the first layer and of the second layer with respect to each other. On account of the failure of the web elements, the first layer and the second layer are displaced toward each other only in the deformation direction substantially without a lateral yielding movement.

According to a preferred development, the web elements are designed as wall elements or surface elements which extend in the width direction of the first layer and of the second layer. In particular, the web elements can extend here over an entire width of the deformation structure.

In the case of the deformation structure according to the invention, the first layer and the second layer are preferably of substantially identical design or shape.

This facilitates production of the deformation structure. Furthermore, complementary protrusions and depressions are thereby possible in a simple manner.

According to a preferred development of the deformation structure, the protrusions of the first layer and the depressions of the second layer and also the depressions of the first layer and the protrusions of the second layer are arranged lying opposite one another in an initial position of the deformation structure.

By this means, the deformation structure can be deformed in the deformation direction at a relatively low force level in the event of a low collision impulse.

The deformation structure can preferably be formed from a plastics material.

By this means, the deformation structure can be designed to be light and corrosion-resistant.

The deformation structure can preferably be formed integrally here.

This simplifies production and a number of components is thereby particularly small.

The production of the deformation structure from plastic, in particular the integral deformation structure, can take place, for example, by means of extrusion or by an additive production method.

By this means, the deformation structure can be produced particularly efficiently at low cost.

According to a particularly preferred development, the first layer and the second layer are each designed in the form of a corrugated plate. Corrugation crests and corrugation troughs form the protrusions and depressions here.

The protrusions and depressions (corrugation crests and corrugation troughs) can preferably have a trapezoidal configuration.

By means of this geometrical configuration, the protrusions and depressions of the opposite layers are easily displaceable into one another.

The deformation structure according to the present invention can have a multiplicity of layers, wherein two adjacent layers each form a first layer and a second layer. For example, the deformation structure can have three, four, five, six or more layers.

According to a preferred development of the deformation structure, the connecting webs are arranged in a layer intermediate space between two adjacent layers, and the connecting webs of two adjacent layer intermediate spaces are oriented in opposite directions in respect of their shifting action. Shifting action means here, for example, a pivoting movement in opposite directions.

Uniform deformation of the deformation structure with the multiplicity of layers is intended to thereby be achieved in the event of the low collision impulse.

The present invention also relates to a pedestrian protection device for a motor vehicle having a deformation structure according to the invention. The deformation structure is preferably arranged here between a vehicle outer skin element and a body carrier element.

In the event of a collision impulse, the deformation structure is supported here on the body carrier element.

The vehicle outer skin element can be a bumper cladding. The body carrier element can be a bumper cross member.

By means of the pedestrian protection device according to the invention having the deformation structure, a collision sensor system and an actuator system are not necessary for optionally actively locking or unlocking a mechanical mechanism and therefore for being able to switch over as required between a structure with a "soft" deformation behavior and a "stiff" deformation behavior. The pedestrian protection device according to the invention having the deformation structure acts automatically depending on a collision impulse which, in turn, depends on a collision speed of the motor vehicle. The deformation direction is in particular a collision direction and, when used for pedestrian protection in the motor vehicle front, is substantially a longitudinal direction of the vehicle.

In principle, the scope of protection of the deformation structure according to the invention extends, however, also to all other use regions in the automotive sector or else in other technological fields in which deformability of a deformation structure with different load levels depending on a load situation is required.

Accordingly, in the event of the low collision impulse and therefore the low collision speed of the motor vehicle, the opposite layers pivot in such a manner that the protrusions of the opposite layers lie opposite one another and are supported on one another. The deformation structure accordingly acts in a stiff manner. In the event of the high collision impulse and therefore the high collision speed, the opposite layers do not pivot, and therefore the opposite protrusions and depressions of the opposite layer are displaceable into one another. The deformation structure therefore reacts more softly for a longer deformation distance.

For example, the pedestrian protection device can be designed in such a manner that, in the event of a collision impulse which is produced up to a threshold value speed of the motor vehicle, the deformation structure reacts more stiffly, and is deformed in the event of a higher force. At the low collision speed, a collision load can therefore be transferred to the body element located therebehind—at a very low speed—or, in order to protect components located therebehind, energy is sufficiently absorbed by the deformation structure—at a somewhat higher speed which is, however, below the threshold value speed. In each case, the repair costs can therefore be reduced, wherein, in particular at the very low speed—for example in the event of what are referred to as parking prangs or dings—the repair costs can be possibly limited to repairing paint damage, for example.

The threshold value speed can be, for example, 20 km/h or the like.

Furthermore, the pedestrian protection device can be designed in such a manner that, in the event of a collision impulse which is produced from and including the threshold value speed of the motor vehicle, the deformation structure reacts more softly and is deformed with a lower force. This is particularly advantageous in the case of a head-on collision of the pedestrian with the motor vehicle from the threshold value speed since lower collision forces act here on the pedestrian.

Other objects, advantages and novel features of the present invention will become apparent from the following detailed description of one or more preferred embodiments when considered in conjunction with the accompanying drawings.

DETAILED DESCRIPTION OF THE DRAWINGS

Exemplary embodiments of the present invention are described below with reference to FIGS. 1 to 12.

Figure 1:
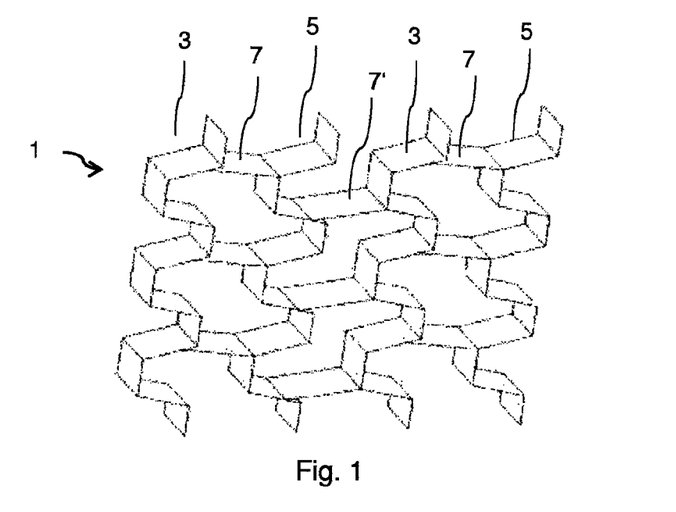
FIG. 1 shows schematically in a perspective view a deformation structure according to an exemplary embodiment of the present invention.

FIG. 1 shows in a perspective view a deformation structure 1 according to an exemplary embodiment of the present invention. The deformation structure 1 is mounted at a front end of a motor vehicle front part, in particular a motor vehicle front, in front of a bumper cross member (not shown) at the point of a known pedestrian protection foam. In particular, the deformation structure 1 is arranged in a space between a vehicle outer skin, that is to say a bumper cladding, and the bumper cross member.

As is shown in FIG. 1, the deformation structure 1 has a series of consecutively arranged layers 3, 5, 3, 5. The layers 3, 5, 3, 5 are spaced apart from one another and are connected to one another via connecting webs 7, 7', which form web elements according to the present invention. The layers 3, 5, 3, 5 are designed in the form of trapezoidally corrugated plates. The layers 3, 5, 3, 5 are illustrated here with a relatively small depth and can optionally extend over an entire vehicle width.

Figure 2:
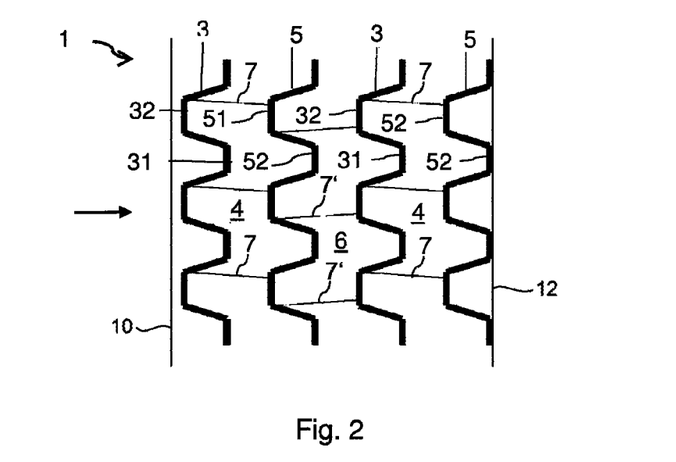
FIG. 2 shows schematically in a side view the deformation structure according to the exemplary embodiment of the present invention.

FIG. 2 shows a side view of the deformation structure 1, wherein a deformation direction of the deformation structure 1 in FIG. 2 runs from left to right and is illustrated by an arrow. In this case, the deformation direction is a longitudinal direction of the vehicle. A vertical direction in the plane of the drawing can preferably correspond to a vertical direction of the vehicle or to a transverse direction of the vehicle. The deformation structure 1 has its deformation function in said deformation direction. In this case, in particular a bumper cladding illustrated only schematically by line 10 is arranged on the left side and a bumper cross member illustrated only schematically by line 12 on the right side. The layers 3, 5, 3, 5 have a substantially identical design. A first layer 3 from the left consists of mutually alternating protrusions 31 and depressions 32 which are each of trapezoidal design. The second layer 5 from the left likewise consists of mutually alternating protrusions (corrugation crests) 51 and depressions (corrugation troughs) 52. These are adjoined by two further layers 3 and 5. Two adjacent layers 3 and 5 are arranged spaced apart from each other and are connected to each other by connecting webs 7, 7'. In the event of a load which acts in the deformation direction, the connecting webs 7, 7' are designed to be deformable.

The deformation structure 1 is preferably produced from a plastics material, as a result of which the deformation structure 1 can be produced cost-effectively and can be designed to be sufficiently light. In particular, the deformation structure 1 can be produced in one piece by an additive manufacturing method or an extrusion method. Alternatively, the layers 3, 5 could also be produced separately and subsequently connected to each other via the webs by means of a suitable method. For example, the webs could be added by extrusion retrospectively.

The layers could alternatively also be produced from a metallic material, for example aluminum or an aluminum alloy, and could then be connected in a further method step to the webs via an extrusion method.

Figure 3A:
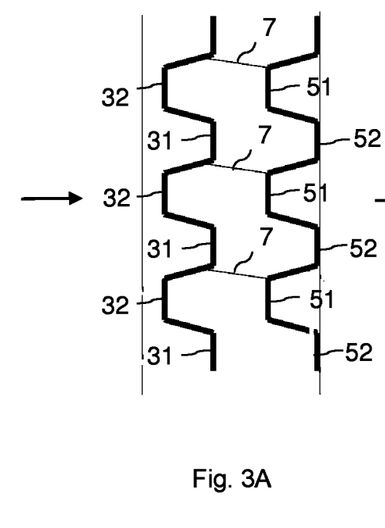
FIGS. 3A to 3C show schematically in a side view a smallest unit of the deformation structure according to the exemplary embodiment of the present invention in a collision load situation with a low collision impulse.
Figure 3B:
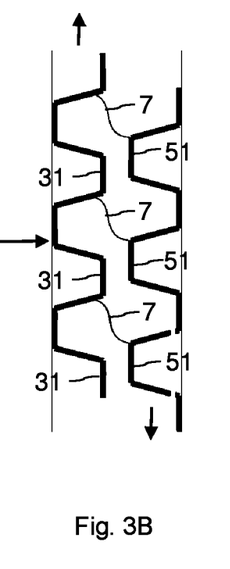
Figure 3C:
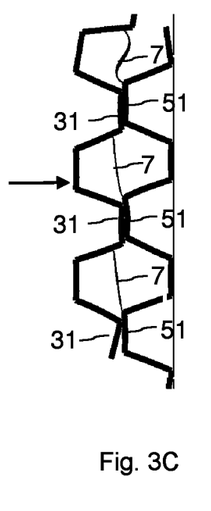
Figure 4A:
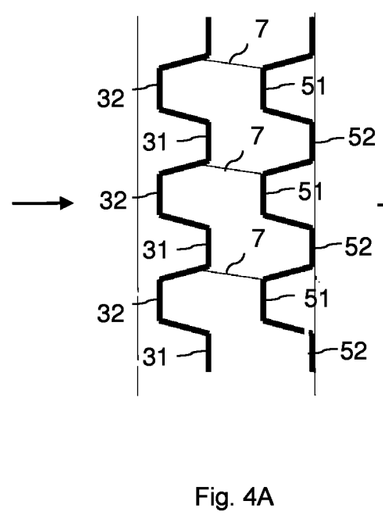
FIGS. 4A to 4C show schematically in a side view the smallest unit of the deformation structure according to the exemplary embodiment of the present invention in a collision load situation with a high collision impulse.

FIGS. 3A and 4A illustrate a smallest unit—based on a number of layers—of the deformation structure 1. The smallest unit has the first layer 3 and the second layer 5, which are connected to each other via the deformable webs 7. Using the smallest unit, a function of the deformation structure 1 will be described below with reference to FIGS. 3A to 3C and 4A to 4C in different collision load situations.

In the event of a head-on collision of the motor vehicle with an object or a person, a load, or at least a resultant force of a collision load, acts in the longitudinal direction of the vehicle on the deformation structure 1, wherein the first layer 3 is displaced in the direction of the second layer 5 with the connecting webs 7 being deformed. In the initial position of the deformation structure 1 that is shown in FIGS. 3A and 4A, the protrusions 31 of the first layer 3 and the depressions 52 of the second layer 5 and also the depressions 32 of the first layer 3 and the protrusions 51 of the second layer 5 lie opposite one another. If the first layer 3 and the second layer 5 were not connected to each other via the connecting webs 7, the first layer 3 and the second layer 5 could be displaced unobstructed from said initial position toward each other and into each other.

Figure 4B:
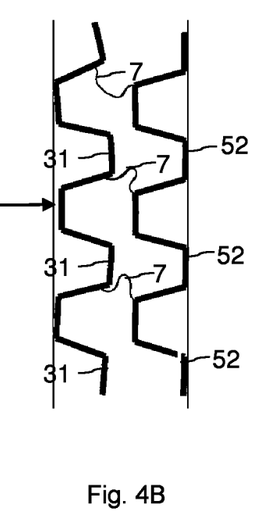
Figure 4C:
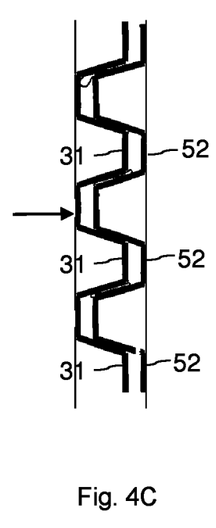

FIGS. 3B and 3C show a collision load situation in the event of a low collision impulse which occurs, for example, at a collision speed of the motor vehicle of below a predetermined collision speed of 20 km/h and which is less relevant for pedestrian protection. FIGS. 4B and 4C show a collision load situation in the event of a high collision impulse which occurs, for example, at a collision speed of the motor vehicle of equal to or above the predetermined collision speed of 20 km/h. The predetermined collision speed is merely referred to here by way of example and may also have a different value.

A function of the deformation structure 1 during the collision of the motor vehicle at the collision speed of less than 20 km/h will first of all be described with reference to FIGS. 3B to 3C.

Whereas, in FIG. 3A, the state before the beginning of the deformation of the deformation structure 1 is shown, FIG. 3B finally shows the start of deformation of the connecting webs 7 under the collision load with the low collision impulse. The connecting webs 7 are arranged and configured in such a manner that, in the event of the low collision impulse, the first layer 3 and the second layer 5 undergo a pivoting movement while they are pressed with respect to each other. The connecting webs 7 here optionally form what is referred to as a film joint which assists the pivoting movement or defines the pivoting path. With said pivoting movement, in addition to the movement towards each other, a parallel shifting of the first layer 3 and of the second layer 5 in relation to each other takes place. In the process, the protrusions 31 of the first layer 3 enter into a position lying opposite the protrusions 52 of the second layer 5, as shown in FIG. 3B. FIG. 3C shows how the upper sides or end sides of the protrusions 31 of the first layer 3 enter into contact with the upper sides or end sides of the protrusions 51 of the second layer 5. Further deformation of the deformation structure 1 in the collision direction or deformation direction can then take place merely by deformation of the protrusions 31 and 51, which takes place at a relatively high force level. By this means, the deformation structure 1 has a relatively high stiffness in the collision speed range below approximately 20 km/h.

In the event of the slow collision speed, the deformation structure 1, depending on the collision load level, therefore transmits the collision load directly to a motor vehicle structure located therebehind, i.e. the bumper cross member, or the individual layers 3, 5 of the deformation structure 1 fail in a brittle manner by breaking after the protrusions 31, 51 strike against each other, and/or fail by plastic deformation at a higher load level than in the case of the more rapid collision speed.

In particular, the deformation structure 1 can be configured in such a manner that, in the event of collision speeds of, for example, less than 4 km/h, it can transmit a collision load to the crash structure without failure of the deformation elements 3. That is to say, the connecting webs 7 are merely deformed elastically and the structure of the layers 3 and 5 itself does not fail. This is advantageous if, in the event of what are referred to as parking prangs or the like, it is intended that no damage to the motor vehicle requiring repair will arise, and has an influence on, for example, an insurance classification of the motor vehicle.

A function of the deformation structure 1 in the event of the collision of the motor vehicle with the collision speed equal to or greater than 20 km/h will be described below with reference to FIGS. 4B and 4C.

Whereas, in FIG. 4A, the state before the beginning of the deformation of the deformation structure 1 is shown, FIG. 4B finally shows the beginning of the deformation of the connecting webs 7 under the collision load with the high collision impulse. The connecting webs 7 are arranged and configured in such a manner that they fail or are more or less folded up in the event of the high collision impulse such that they cannot deploy any film joint effect. In the event of the high collision impulse, the mass inertia of the first layer 3 is in particular of such a magnitude that the connecting webs 7 cannot bring about or assist any lateral yielding movement of the first layer 3 and the second layer 5. By this means, the protrusions 31 of the first layer 3 and the depressions 52 of the second layer 5 are moved directly toward each other. Over the further course of the collision and deformation of the deformation structure 1, that is shown in FIG. 4C, the protrusions 31 of the first layer 3 are completely pushed into the depressions 52 of the second layer 5. The protrusions 51 of the second layer 5 are likewise completely pushed into the depressions 32 of the first layer 3. Since, for this purpose, substantially no deformation of the structure of the first layer 3 or of the second layer 5 is required, deformation of the deformation structure 1 (at least as far as the state shown in FIG. 4c) takes place at a relatively low force level.

This is advantageous insofar as it is important from the collision speed of approximately 20 km/h for the front end of the motor vehicle front part, and in particular for the bumper cladding in conjunction with the deformation structure 1, to react sufficiently softly with a low deformation force level in order to protect a pedestrian. Accordingly, if the collision counterpart is a pedestrian, at a speed of approximately 20 km/h and more, a relatively low force advantageously acts on the pedestrian.

All in all, the deformation structure 1 according to the invention therefore makes it possible to solve a conflict of objectives which firstly permits sufficiently great stiffness of the deformation structure 1 or a sufficiently large deformation force level of the deformation structure 1 at very low collision speeds which are irrelevant to pedestrian protection, and ensures sufficient pedestrian protection by means of a low deformation level at a somewhat higher collision speed which is relevant to pedestrian protection.

Figure 5:
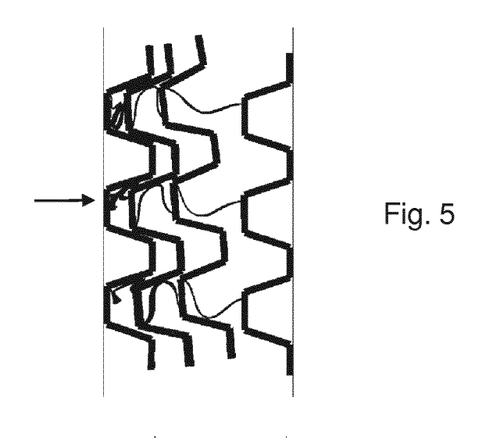
FIGS. 5 and 6 show schematically in a side view the deformation structure according to the exemplary embodiment of FIG. 2 in a collision load situation with a high collision impulse.
Figure 6:
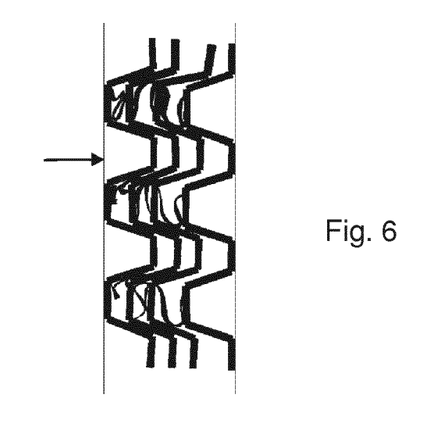

FIGS. 5 and 6 show the deformation structure 1 according to FIG. 2 with the four layers 3, 5, 3, 5, which are connected via connecting webs 7, 7', during the collision with a high collision impulse, analogously to FIGS. 3B and 3C.

Figure 7:
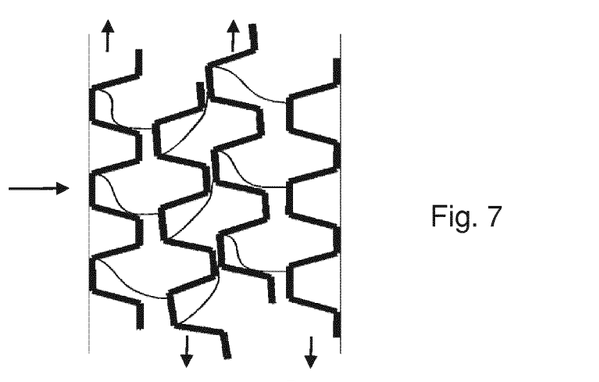
FIGS. 7 to 9 show schematically in a side view the deformation structure according to the exemplary embodiment of FIG. 2 in a collision load situation with a low collision impulse.
Figure 8:
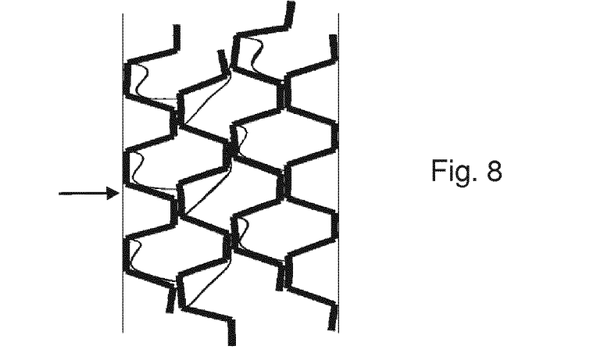
Figure 9:
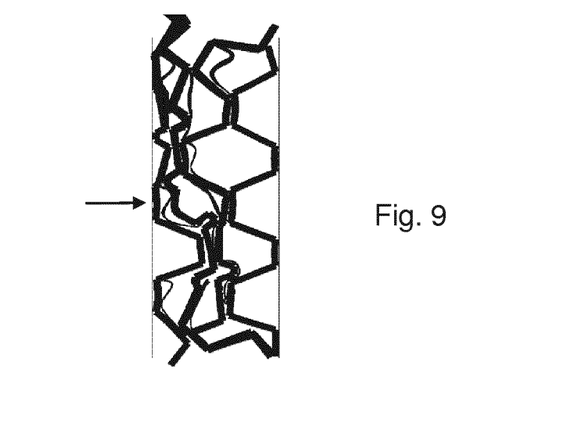

FIGS. 7 and 8 show the deformation structure 1 according to FIG. 2 with the four layers 3, 5, 3, 5, which are connected via connecting webs 7, 7', during the collision with the low collision impulse, analogously to FIGS. 4B and 4C. Furthermore, FIG. 9 shows the state of plastic and/or brittle failure of the structure of the individual layers 3, 5, 3, 5 starting from the state in FIG. 8.

According to FIGS. 5, 6, 7, 8 and 9, it can be seen that the functional principle of the deformation structure 1 that is described in detail in respect of the smallest unit with reference to FIGS. 3A, 3B, 3C, 4A, 4B and 4C also functions with a larger number than two layers, and, depending on the application situation, the deformation structure 1 can have any desired number of layers. Similarly, the layers of the deformation structure 1 can have any desired number of protrusions and depressions.

Figure 10:
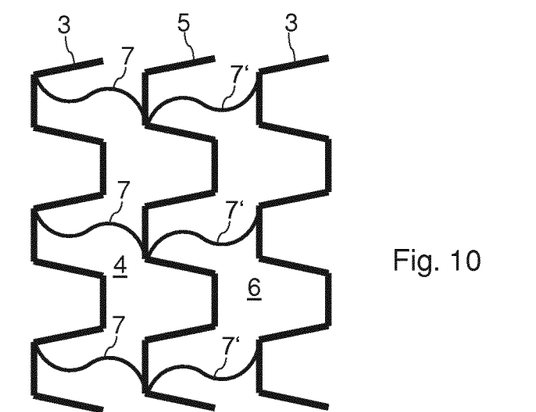
FIGS. 10 to 12 show further exemplary embodiments of a deformation structure according to the present invention with other connecting webs.
Figure 11:
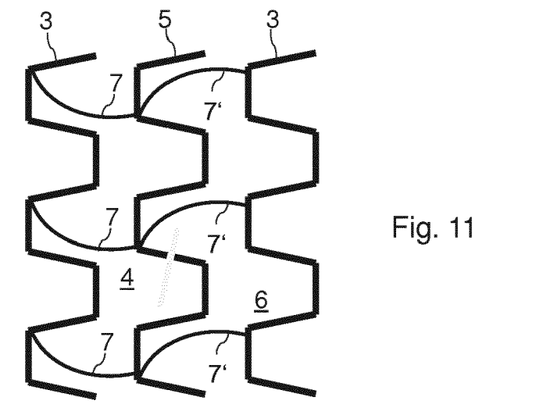
Figure 12:
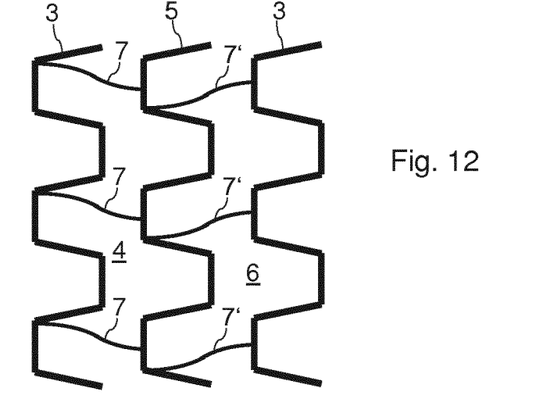

FIGS. 10, 11 and 12 furthermore show exemplary embodiments of the deformation structure 1 which differs from the previously described exemplary embodiment by means of a geometrical configuration of the connecting webs 7, 7'. Furthermore, a multiplicity of further geometrical configurations of the connecting webs are also contemplated. The connecting webs 7, 7' are in each case configured in such a manner that they permit pivoting of adjacent layers 3, 5 with respect to each other. Furthermore, it is advantageous if the connecting webs 7, 7' between the first layer 3 and the second layer 5, i.e. in a first layer intermediate space 4, and the connecting webs 7, 7' between the second layer 5 and the third layer 3, i.e. in a second layer intermediate space 6, are configured differently in such a manner that pivoting of the adjacent layers 3, 5 in mutually opposite directions takes place. In other words, the connecting webs 7, 7' in adjacent layer intermediate spaces 4, 6 are oriented in an opposed manner such that they promote pivoting of adjacent layer pairs 3, 5 and 5, 3 in opposed directions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A deformation structure, comprising:
a first layer and a second layer, which are arranged spaced apart from each other in a deformation direction and displaceable with respect to each other, wherein
the first layer and the second layer have complementary protrusions and depressions, which are configured such that the protrusions of the first layer and the depressions of the second layer and also the protrusions of the second layer and the depressions of the first layer are insertable into one another,
the first layer and the second layer are connected to each other via deformable web elements such that, in an event of a high impulse in the deformation direction, the protrusions of the first layer enter into depressions of the second layer and also protrusions of the second layer enter into the depressions of the first layer, whereby deformation of the deformation structure in the deformation direction takes place at a low force level, and, in an event of a low impulse in the deformation direction, the protrusions of the first layer strike against the protrusions of the second layer, whereby deformation of the deformation structure in the deformation direction takes place at a high force level.

2. The deformation structure as claimed in claim 1, wherein
the first layer and the second layer are shiftable in a direction parallel to each other by deformation of the web elements.

3. The deformation structure as claimed in claim 2, wherein
the web elements fail in a brittle and/or plastic manner in the event of the high collision impulse, and
the web elements act in a manner corresponding to a film hinge in the event of the low collision impulse.

4. The deformation structure as claimed in claim 1, wherein
the web elements fail in a brittle and/or plastic manner in the event of the high collision impulse, and
the web elements act in a manner corresponding to a film hinge in the event of the low collision impulse.

5. The deformation structure as claimed in claim 1, wherein
the web elements are configured as wall/surface elements which extend over an entire width of the first layer and of the second layer.

6. The deformation structure as claimed in claim 1, wherein
the first layer and the second layer are of substantially identical design.

7. The deformation structure as claimed in claim 1, wherein
the protrusions of the first layer and the depressions of the second layer and also the depressions of the first layer and the protrusions of the second layer are arranged lying opposite one another in an initial position of the deformation structure.

8. The deformation structure as claimed in claim 1, wherein
the deformation structure is formed from a plastics material.

9. The deformation structure as claimed in claim 8, wherein
the deformation structure is integrally formed from the plastics material.

10. The deformation structure as claimed in claim 1, wherein
the first layer and the second layer are each configured as a corrugated plate, and
the protrusions and the depressions have a trapezoidal cross-sectional shape.

11. The deformation structure as claimed in claim 1, further comprising:
a number of additional layers, wherein two adjacent ones of said layers each form a first layer and a second layer.

12. The deformation structure as claimed in claim 11, wherein
the connecting webs are arranged in a layer intermediate space between two adjacent layers, and
the connecting webs of two adjacent layer intermediate spaces are oriented in opposite directions in respect of their shifting action.

13. A pedestrian protection device for a motor vehicle, comprising:
a deformation structure as claimed in claim 1, wherein
the deformation structure is arranged between a vehicle outer skin element and a body carrier element.

14. The pedestrian protection device as claimed in claim 13, wherein
the outer skin element is a bumper cladding, and
the body carrier element is a bumper cross member.

* * * * *